United States Patent [19]

Adachi et al.

[11] 4,013,430

[45] Mar. 22, 1977

[54] PROCESS FOR REGENERATING ABSORBING SOLUTION USED FOR EXHAUST GAS PURIFICATION

[75] Inventors: Keiji Adachi; Tokio Gorai, both of Chiba; Kazuaki Ohami, Funabashi; Takehiko Takahashi; Takayoshi Mizukami, both of Ichihara, all of Japan

[73] Assignees: Chisso Corporation, Osaka; Chisso Engineering Co. Ltd., Tokyo, both of Japan

[22] Filed: Dec. 29, 1975

[21] Appl. No.: 645,174

[30] Foreign Application Priority Data

Dec. 28, 1974 Japan .................................. 50-3986
Dec. 28, 1974 Japan .................................. 50-3987

[52] U.S. Cl. .............................. 55/37; 55/48; 55/73; 55/89
[51] Int. Cl.² ....................................... B01D 53/14
[58] Field of Search ............ 55/68, 73, 84, 89, 37, 55/48; 423/235, 242, 243, 539, 541

[56] References Cited

UNITED STATES PATENTS

| | | | |
|---|---|---|---|
| 3,503,185 | 3/1970 | Delzenne et al. | 423/242 X |
| 3,556,722 | 1/1971 | Owaki | 423/539 X |
| 3,644,087 | 2/1972 | Urban | 423/242 |
| 3,653,812 | 4/1972 | Schneider et al. | 423/539 |
| 3,923,954 | 12/1975 | Petrey, Jr. et al. | 423/235 X |
| 3,933,993 | 1/1976 | Salemme | 423/243 X |

FOREIGN PATENTS OR APPLICATIONS 1,251,900 10/1967 Germany ............................ 423/235

*Primary Examiner*—Frank A. Spear, Jr.
*Assistant Examiner*—Robert H. Spitzer
*Attorney, Agent, or Firm*—Fred Philpitt

[57] ABSTRACT

In the process wherein industrial exhaust gases containing nitrogen oxides and $SO_2$ are treated with an absorbing solution containing an iron chelate complex and a sulfite to remove nitrogen oxides and $SO_2$, the absorptivity of the solution is reduced sometimes on account of dithionate formed during the treatment. The absorptivity-reduced absorbing solution is regenerated by heat-treating the solution at a pH of 3.0 or lower and a temperature of 80° C or higher whereby the dithionate is decomposed.

5 Claims, No Drawings

PROCESS FOR REGENERATING ABSORBING SOLUTION USED FOR EXHAUST GAS PURIFICATION

DESCRIPTION OF THE INVENTION

This invention relates to a process for treating absorbing solutions for purifying industrial exhaust gases containing nitrogen oxides and $SO_2$, for the purpose of regenerating said solutions.

Industrial exhaust gases, particularly combustion exhaust gases generated when sulfur-containing fuels are used in industrial combustion equipments such as boiler, contain nitrogen oxides and $SO_2$ which are harmful to the environmental conservation.

The necessity of removal of harmful matters from industrial exhaust gases before their discharge to the atmosphere has increased particularly in recent years to prevent the atmosphere pollution.

A number of processes for simultaneously removing nitrogen oxides and $SO_2$ have been proposed. Among them, a process of treating the exhaust gases with an absorbing solution (mainly an aqueous solution) containing an iron chelate complex salt and a sulfurous acid salt (sulfite) is effective particularly from practical viewpoint.

However, when this process is put into practice commercially, the sulfite contained in the absorbing solution is oxidized by the nitrogen oxides and oxygen contained in the exhaust gases to form a higher order oxide salt of sulfur. If the amount of this salt formed is larger than that of the sulfite formed during the same period of time, by absorbing $SO_2$ contained in the exhaust gases, the concentration of the sulfite in the solution is reduced, whereby the effective removal of nitrogen oxides in the industrial exhaust gases to be treated, by the use of the absorbing solution, becomes difficult. Namely, the process has a drawback in a rapid reduction of absorptivity.

The present inventors have studied to establish a process in order to overcome the above-mentioned drawback while maintaining the absorptivity of the absorbing solution, and as a result, have found that the oxidation product from the sulfite, formed in the absorbing solution, has a large amount of dithionic acid salt (dithionate), and further have established, based upon this finding, a commercial process of treating the absorbing solution containing the dithionate under specified conditions of the present invention in which the dithionate is decomposed into $SO_2$ and sulfate.

As suggested by the above-mentioned technical problem raised and its solution, a first object of the present invention is to provide a method for decomposing the dithionate contained in the absorbing solution containing an iron chelate complex salt and a sulfite which has been used for purifying industrial exhaust gases (which will be hereinafter abbreviated as "absorbing solution for purifying exhaust gases"), recovering the resulting $SO_2$, regenerating the sulfite therefrom, supplying the resulting sulfite into the absorbing solution for purifying exhaust gases and thereby maintaining the absorptivity of the absorbing solution and thus overcoming the above-mentioned drawback of the prior art (rapid reduction in aborptivity).

A second object of the present invention is, when sulfates such as calcium sulfate, ammonium sulfate, etc. are to be separated and recovered from the absorbing solution for purifying exhaust gases and the resulting absorbing solution is circulated and reused, to provide a method for preventing dithionic acid from being successively accumulated in the circulation system and mixing with a portion of the above-mentioned recovered product.

Other objects of the present invention will be apparent from the description mentioned below.

After strenuous studies, the present inventors have attained the present invention.

The present invention resides in:

1. In the process for treating industrial exhaust gases containing nitrogen oxides and $SO_2$ with an absorbing solution containing an iron chelate complex sald and a sulfite in an absorbing zone to remove nitrogen oxides and $SO_2$ from the industiral exhaust gases, a process for regenerating and recirculating the absorbing solution which comprises heat-treating the absorbing solution withdrawn from the absorbing zone during or after the absorption treatment, at a pH of 3.0 or lower and a temperature of 80° C or higher, to decompose dithionate contained in the absorbing solution, and recirculating the resulting regenerated absorbing solution to the absorbing zone.

Further the present invention includes the following embodiments:

2. A process according to the process (1) wherein the absorbing solution is maintained at a pH of 0-1 in the regeneration step, by adding sulfuric acid thereto;

3. A process according to the process (1) wherein said heat-treating is carried out at 120-140° C under pressure;

4. A process according to the process (1) wherein the absorbing solution is cooled to about 0° C in advance of the regeneration step, and the chelating agent constituting said iron chelate complex salt precipitated thereby is removed;

5. A process according to the process (1) wherein the chelating agent constituting said iron chelate complex salt is ethylenediaminetetraacetate; and 6. A process according to the process (1) wherein said sulfite is ammonium sulfite and ammonium sulfate formed by the decomposition of dithionate is separated in advance of the recirculation of the absorbing solution.

As for the industrial exhaust gases containing nitrogen oxides and $SO_2$ to be absorbed by the absorbing solution for treating exhaust gases, in the present invention, combustion exhaust gases from boilers, heating furnaces, etc. wherein sulfur-containing coal, heavy oil or the like is burnt are representative. The iron chelate complex salt referred to herein is a complex ion formed by coordination of ethylenediaminetetraacetate or a similar compound such as nitrilotriacetate, cyclohexanediaminetetraacetate, diethylenetriaminepentaacetate or the like, with a ferrous or ferric ion as the central metal ion, or a water-soluble salt of said complex ion, and also includes mixtures of the both.

As for the sulfite referred to herein, sulfites or hydrogen sulfites of sodium, potassium, magnesium, calcium and ammonium and mixtures thereof are enumerated.

As for the formation of dithionate and imidodisulfate by the absorption and reduction of nitrogen oxides (NO, $NO_2$, etc.) contained in the industrial exhaust gases, its reaction formula is summarized and illustrated by the following formula (1). The oxidation of the sulfite into dithionate and the decomposition of dithionate are illustrated by the following formulas (2) and (3), respectively:

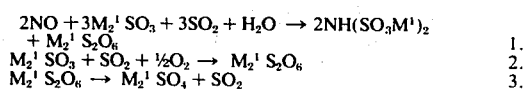

(wherein $M^1$ shows an ion of monovalent metal or ammonium).

The decomposition treatment of dithionate in the present invention is achieved by heating the absorbing solution having its pH adjusted to 3.0 or lower, at 80° C or higher. In general, the alkali or alkali metal salts of dithionic acid are regarded as stable in hot aqueous solution, but, in the present invention, the decomposition of dithionate as illustrated in the above-mentioned formula (3) is considered to be based upon a composite effect of temperature and pH. At a higher pH and a lower temperature, a longer time is required for the decomposition. Accordingly it is desirable to carry out the decomposition at a pH of 1.5 or lower, preferably 1.0 or lower and at a temperature of 100° C or higher, preferably 120° C or higher. As for the optimum conditions for carrying out the process commercially, the absorbing solution whose pH has been adjusted to 0–1 by adding sulfuric acid is introduced into a closed vessel continuously or intermittently and heated at 120°–140° C for a mean retention time of 1–10 hours.

Of course, it is also possible to carry out the process at a pH in the vicinity of 0 and at a temperature higher than 140° C, but, it is necessary to pay attention to the fact that in such a case, the amount of sulfur as simple substance formed due to side reaction, the loss of chelating agent, etc., are liable to increase.

$SO_2$ generated during the practice of the above-mentioned process is taken out as it is in the mixed state with steam so as not to allow the inner pressure of the vessel to exceed the steam pressure corresponding to the temperature in the vessel, and utilized for other purpose or sent to an equipment for washing exhaust gases to be absorbed in the absorbing solution and circulated. Such a circulation serves the purpose of the maintenance of sulfurous acid concentration in the absorbing solution.

The absorbing solution taken out from the equipment for washing exhaust gases during or after the washing (absorption) contains imidodisulfate and amidosulfate formed by reduction of nitrogen oxides, in addition to dithionate, and these sulfates are decomposed into sulfuric acid and ammonium sulfate simultaneously with decomposition of dithionate. Thus it is unnecessary to carry out any particular treatment except for removal of sulfuric acid or sulfate.

The iron chelate complex salt contained in the absorbing solution is stable, but a part of the chelating agent constituting the complex salt, represented by ehtylenediaminetetraacetate (EDTA), may be decomposed depending upon decomposition conditions. However, EDTA is precipitated as a solid on cooling in a strongly acidic state which is one of the decomposition conditions of dithionic acid. Thus, if an acid is added to the solution to be treated and the resulting solution is cooled to about 0° C to separate precipitated EDTA by filtration and then carry out the above-mentioned heat-treatment, the above-mentioned loss due to decomposition can be prevented.

The absorbing solution to be treated (regenerated) according to the process of the present invention is that taken out during or after the absorption treatment of exhaust gases, as mentioned above, and the concentration of dithionate in the solution is usually about 5–15%, and the concentration in total, of imidodisulfate and amidosulfate in the solution is usually about 1–5%, but even when the solution has concentrations of these compounds outside the above-mentioned ranges, the solution can be also decomposition-treated according to the process of the present invention.

It is preferable to treat the solution to be treated, after concentrated to a suitable concentration in advance of the treatment, since there are the following advantages brought about thereby: the capacity of decomposition apparatus for the treatment (autoclave mentioned below in Examples) can be made smaller; after concentration and subsequent cooling of the absorbing solution, EDTA is easily separated; and the percentage decomposition of dithionic acid in the decomposition (illustrated by the above-mentioned formula (3)) attained by the decomposition treatment is better to some extent than that in the case where unconcentrated absorbing solution is treated as it is.

Any of the above-mentioned dithionates of alkali metals, alkaline earth metals, etc. have very large solubilities and are stable, and any process for treating these compounds commercially has never beem known. Further the dithionates themselves have never been utilized in commercial application fields. In such a situation, it has become possible according to the process of the present invention to treat the absorptivity-reduced solution so as to be able to decompose dithionates effectively, and the drawback of the process for removing nitrogen oxides and $SO_2$ from exhaust gases with an absorbing solution containing an iron chelate complex salt and a sulfite, which process produces a dithionate as byproduct, has now been overcome. Thus the present invention greatly contributes to the improvement in the availability of the process.

As apparent from Examples mentioned below, according to the process of the present invention, the thermal decomposition of dithionic acid is superior in percentage decomposition. For example, by treating the solution to be treated, at 140° C for 2 hours (pH 0.8), a dithionic acid concentration of 12% is lowered to 1.2% (2.4% in case of concentration to twice). As a result, the absorptivity of the solution to be treated (absorbing solution for exhaust gases ) can be restored and maintained. Namely, by absorbing the $SO_2$ generated by the decomposition of dithionic acid in the absorbing solution for treating exhaust gases to maintain the concentration of sulfite in the solution, the absorptivity of the solution for nitrogen oxides contained therein can be maintained, and ultimately the sulfite is oxidized and separated as sulfate from the solution.

Further, if the concentration of dithionate in the absorbing solution is so high as, for example, 10% or higher, the coexistent sulfuric acid is caused to precipitate or separate, as calcium sulfate or other sulfate. In this case, dithionate is often incorporated in said calcium sulfate or other sulfate, in a concentration of about several percent which results in not only a loss of dithionate (indirectly a loss of sulfite), but also a reduction of the purity and hence the practical value of calcium sulfate or other sulfate recovered. Such a drawback, however, can be overcome by maintaining the concentration of dithionate in the absorbing solution at 10% or lower, by the proper practice of the process of the present invention.

The present invention will be further illustrated by the following Examples.

EXAMPLE 1

Nitrogen oxides and $SO_2$ contained in an exhaust gas from a heavy oil combustion boiler was subjected to an absorption treatment with an aqueous solution of sodium sulfite (also containing sodium hydrogen sulfite) containing 3% by weight of iron-EDTA complex salt. To the resulting solution (containing 8.9% by weight of sodium dithioate, 2.0% by weight of sodium imidodisulfate and sodium amidosulfate, 3.0% by weight of sodium sulfite and sodium hydrogen sulfite, and 15% by weight of sodium sulfate) was added conc. sulfuric acid to adjust the pH of the solution to 0.6, followed by heat-treatment at 120° C for 3 hours in an autoclave. During the time of the treatment, the pressure in the autoclave was maintained so as not to exceed 1.0 atmosphere (gauge), by purging $SO_2$ gas from the autoclave. The solution thus treated contained 4.0% by weight of sodium dithionate(percentage decomposition: 55%); no sodium imidodisulfate was detected; and the amount of sodium amidosulfate was reduced to 0.2%.

EXAMPLE 2

Nitrogen oxides and $SO_2$ contained in an exhaust gas from a heavy oil combustion boiler was subjected to an absorption treatment with an aqueous solution of ammonium sulfite (also containing ammonium hydrogen sulfite) containing 3% by weight of iron-EDTA complex salt. THe resulting solution (containing 12% by weight of ammonium dithionate, 2.5% by weight of ammonium imidodisulfate and ammonium amidosulfate, 2.5% by weight of ammonium sulfite and ammonium hydrogen sulfite, and 20% by weight of ammonium sulfate) was concentrated to give twice concentration. To the resulting solution was added conc. sulfuric acid to adjust its pH to 0.8, followed by heat-treatment at 140° C for 2 hours in an autoclave. During the time of the treatment, the pressure in the autoclave was maintained so as not to exceed 3.5 atm (gauge), by purging generated $SO_2$ gas from the autoclave. The solution thus treated contained 2.4% by weight of ammmonium dithionate(percent decomposition: about 90%), and also ammonium sulfate, sulfuric acid and iron chelate complex salt, and further 0.1% by weight or smaller of amidosulfate, etc.

EXAMPLE 3

The same solution after subjected to absorption treatment as in Example 2 was concentrated to twice the original concentration. To the resulting solution was added conc. Sulfuric acid to adjust its pH to 0.2, followed by cooling the solution to 0° C. The precipitated EDTA crystal was separated by filtration. The resulting filtrate was subjected to a heat-treatment at 130° C for 2 hours in an autoclave. During the time of the treatment, the inner pressure of the autoclave was maintained at 2 $Kg/cm^2$ (gauge) or lower, by purging generated $SO_2$. The solution thus treated contained 3.6% by weight of ammonium dithionate (percentage decomposition: about 85%), and also ammonium sulfate, sulfuric acid and iron sulfate, and further 0.1% by weight or smaller of amidosulfate, etc.

The solution was neutralized with ammonia and then concentrated by evaporation. The greater part of the ammonium sulfate contained in the solution was crystallized, separated by filtration and used for fertilizer. Since the resulting mother liquor contained concentrated ammonium dithionate, it was subjected again to treatment for decomposing dithionate, together with the absorbing solution after absorption treatment.

EXAMPLE 4

An aqueous solution of ammmonium sulfite containing 3% by weight of iron-EDTA complex salt after used for removing nitrogen oxides and $SO_2$ contained in a heavy oil combustion exhaust gas therefrom, was subjected to subsequent treatment.

The solution contained 5.5% by weight of ammonium sulfate, 10.2% by weight of ammonium dithionate, 1.2% by weight of ammonium amidosulfate and ammonium imidodisulfate and 4.0% by weight of ammonium sulfite and ammonium hydrogen sulfite, and its pH was 5.8.

One liter of this solution was concentrated to 400 ml, by evaporation on heating under the atmospheric pressure. To the resulting solution was added sulfuric acid to adjust its pH to 2.2, followed by cooling to 0° C. After allowing the solution to stand for 24 hours, 25 g of $Fe^{(III)}$-EDTA complex salt precipitated was separated by filtration. To the resulting filtrate was further added sulfuric acid to adjust its pH to 0.8. About 3 g of EDTA precipitated at 0° C was separated by filtration. The resulting solution was subjected to treatments of sulfate recovery, dithionic acid decomposition, etc.

Filtered $Fe^{(III)}$-EDTA and EDTA were dissolved in the above-mentioned solution after treated, and then the resulting solution was again used for exhaust gas purification treatment.

What is claimed is:

1. In the process for treating industrial exhaust gased containing nitrogen oxides and $SO_2$ with an absorbing solution containing an iron chelate complex salt and a sulfite in an absorbing zone to remove nitrogen oxides and $SO_2$ from the industrial exhaust gases, the improvement which comprises regenerating and recirculating the absorbing solution by
   a. cooling the absorbing solution withdrawn from said absorbing zone during or after the absorption treatment, at a pH of 3.0 or lower and a temperature of about 0° C, to precipitate and remove the chelating agent constituting said iron chelate complex salt contained in the absorbing solution;
   b. heating the resulting absorbing solution at a temperature of 80° C or higher, to decompose dithionate, imidodisulfate and amidosulfate contained in the absorbing solution;
   c. removing $SO_2$ liberated from the absorbing solution, and removing ammonium sulfate by evaporating the absorbing solution to crystallize out and remove ammonium sulfate; and
   d. recirculating the resulting regenerated absorbing solution to said absorbing zone.

2. A process according to claim 1 wherein the absorbing solution is maintained at a pH of 0–1 in the regeneration step by adding sulfuric acid thereto.

3. A process according to claim 1 wherein said heating step is carried out at 120–140° C under pressure.

4. A process according to claim 1 wherein the chelating agent constituting said iron chelate complex salt is ethylenediaminetetraacetate.

5. A process according to claim 1 wherein said sulfite is ammonium sulfite, and ammonium sulfate formed by the decomposition of dithioate is separated in advance of the recirculation of the absorbing solution.

* * * * *